(12) United States Patent
Kashima et al.

(10) Patent No.: US 8,140,447 B2
(45) Date of Patent: Mar. 20, 2012

(54) METHOD FOR REGRESSION FROM INTERVAL TARGET VALUES BY ALTERNATING LINEAR GAUSSIAN AND EXPECTATION-MAXIMIZATION

(75) Inventors: Hisashi Kashima, Kanagawa-ken (JP); Kazutaka Yamasaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 12/099,812

(22) Filed: Apr. 9, 2008

(65) Prior Publication Data

US 2009/0259604 A1    Oct. 15, 2009

(51) Int. Cl.
*G06F 15/18* (2006.01)
(52) U.S. Cl. ........................................................ 706/12
(58) Field of Classification Search ...................... 706/21
See application file for complete search history.

(56) References Cited

U.S. PATENT DOCUMENTS

2004/0260664 A1* 12/2004 Thiesson et al. ................ 706/21

OTHER PUBLICATIONS

Carey, Vincent James (1993). Regression analysis for large binary clusters. Ph.D. dissertation, The Johns Hopkins University, United States—Maryland. Retrieved Jul. 15, 2011, from Dissertations & Theses: Full Text.(Publication No. AAT 9313342) 186 pages.*

Latent Variable, [online]; [retrieved on Jan. 4, 2008]; retrieved from the Internet http://en.wikipedia.org/wiki/Latent_variable.
Knowledge-Based Kernel Approximation, Mangasarian et al., Journal of Machine Learning Research 5 (2004) 1127-1141.
Simpler Knowledge-based support Vector Machines, Quoc V. Le et al., Proceedings of the 23rd International Conference on Machine Learning, Pittsburgh, PA, 2006, ACM International Conference Proceeding Series; vol. 148, pp. 521-528. Copyright 2006 by author(s)/owner(s).
Expectation-maximization algorithm, [online]; [retrieved on Jan. 4, 2008]; retrieved from the Internet http://en.wikipedia.org/wiki/Expectation-maximization_algorithm.
Nonlinear Knowledge in Kernel Approximation, [online]; [retrieved on Mar. 13, 2008]; retrieved from the Internet http://ieeexplore.ieee.org/xpl/freeabs_all.jsp?tp=&arnumber=4049829&isnumber=4049808.

* cited by examiner

*Primary Examiner* — Jeffrey A Gaffin
*Assistant Examiner* — Ola Olude-Afolabi
(74) *Attorney, Agent, or Firm* — Cantor Colburn LLP; Vazken Alexanian

(57) ABSTRACT

Methods, computing devices, and computer program products for regression from interval target values are provided. Training data having an interval output are read. An initial model is estimated. Representative values for the interval output are assigned using the initial model. A regression model is estimated using the representative values for the interval output. A determination is made whether the regression model converges. The step of assigning representative values for the interval output is iterated and the step of estimating the regression model using the representative values for the interval output iterated, in response to the regression model not converging. In response to the regression model converging, the regression model is output.

19 Claims, 3 Drawing Sheets

METHOD FOR REGRESSION FROM INTERVAL TARGET VALUES BY ALTERNATING LINEAR GAUSSIAN AND EXPECTATION-MAXIMIZATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

Exemplary embodiments relate to solving regression problems, and more particularly to regression problems in which target values of training data are provided as intervals, for example, such as "from 40 to 50 inclusive".

2. Description of Background

Regression in general is a problem in which the relationship f: X→Y between an input $x \in X = \Re^D$ which is a D-dimensional real-valued vector and an output $y \in Y = \Re$ which is a real value is estimated from N pairs of input and output $E = \{(x^{(i)}, y^{(i)})\}_{i=1}^{N}$ called training data. The purpose of regression is to predict a correct output for an input $x \notin E$ whose output is unknown.

Regression problems having an interval as an input are important ones and can appear in forecasting sales, for example. However most of existing approaches have not addressed the problems associated with using intervals in regression problems. It would be beneficial to have techniques for addressing regression problems having intervals.

SUMMARY OF EXEMPLARY EMBODIMENTS

A method for regression from interval target values is provided in accordance with exemplary embodiments. Training data having an interval output are read. An initial model is estimated. Representative values for the interval output are assigned using the initial model. A regression model is estimated using the representative values for the interval output. A determination is made whether the regression model converges. In response to the regression model not converging, the step of assigning representative values for the interval output is iterated and the step of estimating the regression model using the representative values for the interval output is iterated. In response to the regression model converging, the regression model is output.

A computing device for regression from interval target values is provided in accordance with exemplary embodiments. Memory stores an application. A processor, functionally coupled to the memory, is responsive to computer-executable instructions contained in the application. The processor is operative to read training data having an interval output, estimate an initial model, assign representative values for the interval output using the initial model, estimate a regression model using the representative values for the interval output, and determine whether the regression model converges. In response to the regression model not converging, the step of assigning representative values for the interval output is iterated and the step of estimating the regression model using the representative values for the interval output is iterated. In response to the regression model converging, the regression model is output.

A computer program product, tangibly embodied on a computer readable medium, for regression from interval target values is provided in accordance with exemplary embodiments. The computer program product includes instructions for causing a computer to execute the above method.

Additional features and advantages are realized through the techniques of the present invention. Exemplary embodiments of the invention are described in detail herein and are considered a part of the claimed invention. For a better understanding of advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features of exemplary embodiments are apparent from the following detailed description taken in conjunction with the accompanying drawings in which:

Figure 1:
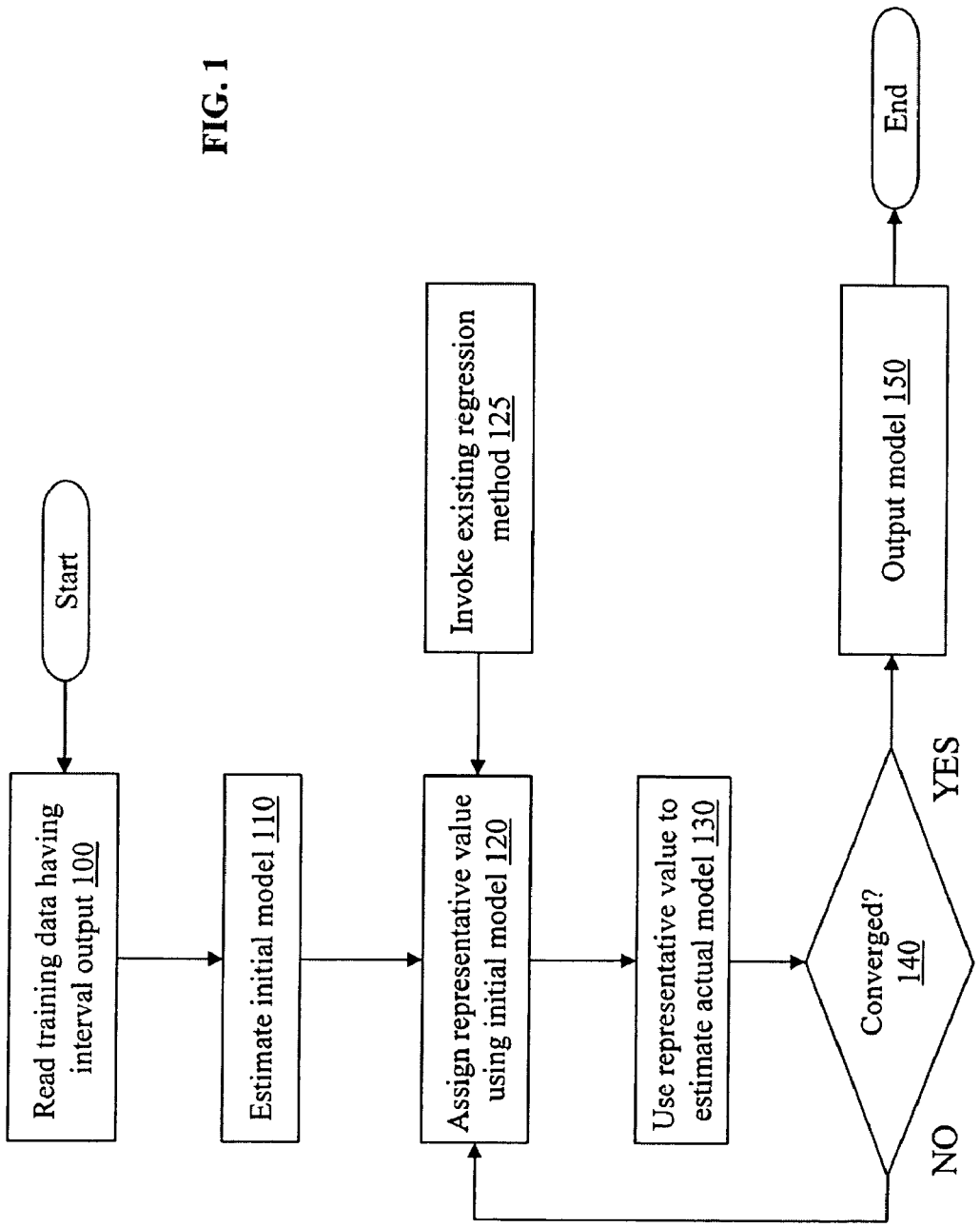
FIG. 1 illustrates a method for regression from interval target values in accordance with exemplary embodiments.

The detailed description explains exemplary embodiments, together with advantages and features, by way of example with reference to the drawings.

DETAILED DESCRIPTION OF EXEMPLARY EMBODIMENTS

Regression problems of exemplary embodiments differ from conventional regression problems in that: an output in training data for a conventional regression problem is given as a real value $y^{(i)}$ like $(x^{(i)}, y^{(i)})$ as described above whereas an output in training data may be given as an interval "from $l^{(i)}$ to $r^{(i)}$ inclusive" like $(x^{(i)}, [l^{(i)}, r^{(i)}])$ in exemplary embodiments. Note that, if $l^{(i)} = r^{(i)}$, conventional regression is included as a special case. That is, exemplary embodiments also address a mixture of training data in which outputs are given as points and training data in which outputs are given as intervals. This allows for situations in which an output is not given as a particular value but as a fuzzier and broader output, namely an interval.

Moreover, when a model (learned or developed) from training data is used to predict an output for a new input x, one may want to predict by using as supplemental information an interval of values [l, r] that an output can take on, if given.

As a non-limiting example, scenario 1 describes forecasting sales from data containing opportunity loss. Suppose that a company wants to forecast the sales quantity of a merchandise item which they have sold to a shop at wholesale. An explanatory variable (such as the category or price of the merchandise item) corresponds to the input x, and the predicted sales quantity of the item, which is a target variable, corresponds to the output y. Explanatory variables and sold quantities can be obtained from sales data of the past as training data. In conventional regression, a function between the input and output is estimated from the data.

However, the past data may include data cases where the merchandise item was sold out because the quantity of the merchandise item sold to the shop was insufficient, although more could have been sold more. Exemplary embodiments address such circumstances. For example, there may be cases where sales of an item were 2,000 units but at least 2,200 units could have been sold if there were sufficient quantities in stock. In that case, the sales quantity would have been "greater than or equal to 2,000" units, rather than "2,000" units. In conventional regression methods, the sales quantity is simply set at "2,000", and such additional data is ignored and not used. In our problem establishment, in contrast, such data can be explicitly treated as sales data in the interval "from 2,000, inclusive, to infinity".

As a non-limiting example, scenario 2 describes a quality analysis for a project. Suppose that one wants to predict an index of the quality of a project in order to predict the quality of the project. The index of project quality may be the number of occurrences of trouble (or the like) reported in the process of execution of the project or, simply, sales, for example. Here, explanatory variables of the project (such as the name of the project manager and the number of project staff members) correspond to the input x, and the number of trouble occurrences, which is a target variable, corresponds to the output y.

For a project already completed, the data on the project can be handled by a conventional regression method because the number of trouble occurrences in the project is known. In the case of a project in progress or an aborted project, however, the number of trouble occurrences reported would be the lower limit of the number of occurrences of trouble that would occur. In addition, there may be trouble that a person in charge did not realize or mistakenly considered not to be reportable. Accordingly, the number of trouble occurrences reported is the lower limit of the actual number of trouble occurrences. For example, if the number of trouble occurrences is "5", the actual number of trouble occurrences would be "greater than or equal to 5". In accordance with exemplary embodiments, such data can be explicitly treated as data "from 5, inclusive, to infinity".

There are a large number of approaches to performing regression. There are various approaches from basic ones such as application of linear models using a least-square method to more complicated ones such as Bayesian approaches. However, none of these approaches directly address problems in which target variables are given as intervals as illustrated in exemplary embodiments.

For example, an existing Approach 1 may ignore data in which the value of a target variable is given as an interval. An existing Approach 2 may determine a representative point given in an ad-hoc manner in an interval (for example, the mean of an interval or the quantity laid in stock in the case of forecasting of sales) and use the representative point as the value of a target variable. Both existing Approaches 1 and 2 have a problem that they do not make full use of target variable information given as an interval. Exemplary embodiments provide techniques for appropriately incorporating target variable information given as an interval.

Figure 2:
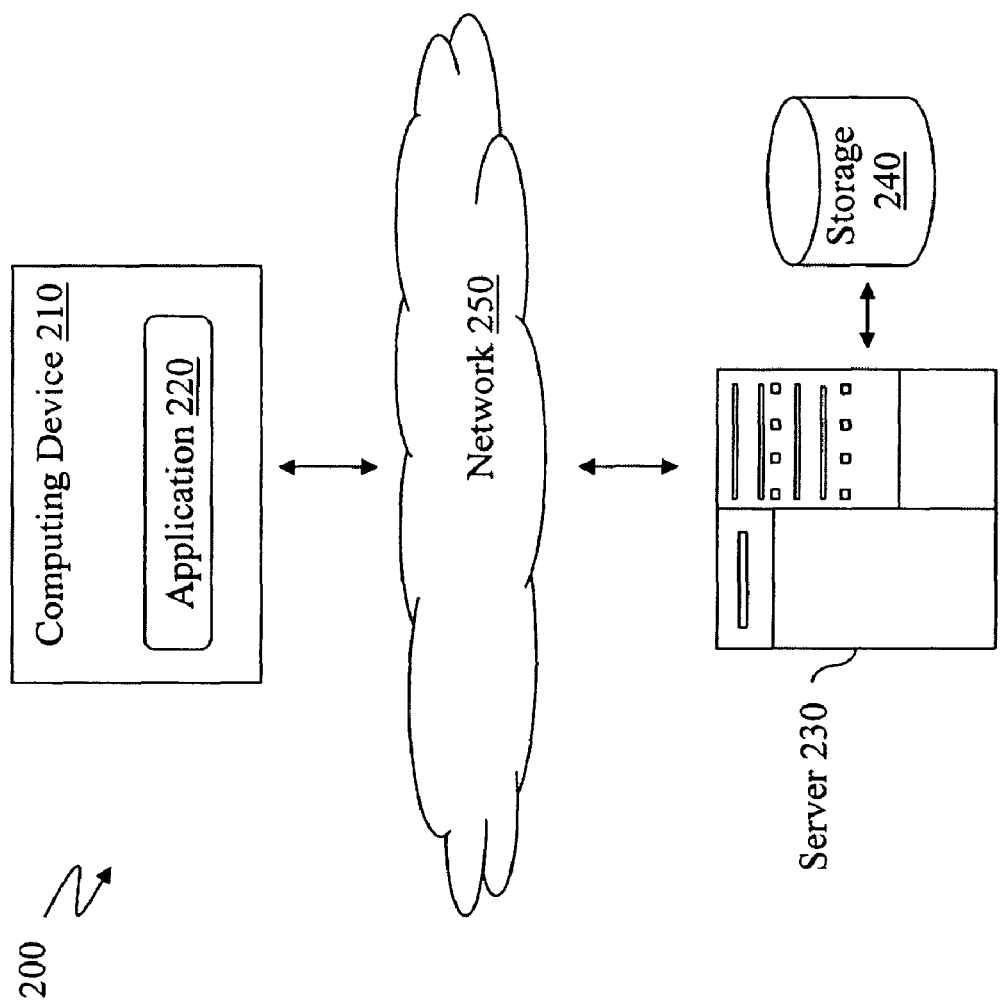
FIG. 2 illustrates a block diagram of a system in accordance with exemplary embodiments.

FIG. 2 illustrates a block diagram of a system 200 in accordance with exemplary embodiments. A computing device 210 comprises an application 220 for creating regression models according to exemplary embodiments. The computing device 210 is operatively connected to one or more servers, such as a server 230 coupled to a storage 240, via a network 250. The server 230 and the storage 240 may contain various types of data and outputs, such as training data.

The network 250 may include circuit-switched and/or packet-switched technologies and devices, such as routers, switches, hubs, gateways, etc., for facilitating communications between the computing device 210 and the server 230 coupled to the storage 240. The network 250 may include wireline and/or wireless components. Also, the network 250 may be an IP-based network.

As described earlier, there are solutions for regression problems in which outputs are given as points. However, exemplary embodiments illustrate how an interval output can be reduced to a point output (with minimum loss of information). If an interval output can be reduced to a point output in accordance with exemplary embodiments, a regression problem that addresses point outputs may be solved with an existing technique.

For training data (stored in the server 230) in which outputs are given as intervals, actual outputs are "latent variables" that are not observed. Therefore, an estimation problem can be solved by the application 220 incorporating an expectation-maximization (EM) algorithm according to exemplary embodiments. According to exemplary embodiments, the application 220 estimates a model by iteratively improving the model. The following broad procedure (described in more detail below) may be implemented by the application 220 and is illustrated to estimate a model using, e.g., an EM algorithm in accordance with exemplary embodiments:

Step 1: Create an appropriate initial model (for example, using "Approach 1").

Step 2: Use the current model to give a "temporary value" of a point output for training data having an interval output.

Step 3: Combine the training data having point outputs with the training data having "temporary values" of the point outputs to estimate a new model. If training data is provided only having point outputs, the model can be estimated by using standard model estimation methods like least square estimation in the case of linear Gaussian model using Equation (4) and Equation (5) below. However, in accordance with exemplary embodiments, using the data with interval outputs as data with temporary (point) output values, we can treat the data with interval outputs as data with point output values. Further, we can mix the temporary (point) output values with the inherently point-valued data, and can apply the standard model estimation methods.

Step 4: Return to step 2 (repeat the procedure until the new model converges). As a non-limiting example, the iterations may be stopped when a fixed number of iterations are done in accordance with a predefined number in exemplary embodiments. Also, we may compare the parameters obtained after the current iteration with the parameters of the last iteration, and quit the iterations when the parameters are not so different in exemplary embodiments. More particularly, we may define a distance d(theta, theta') between two sets of parameters theta and theta'. For example, d(theta, theta') is defined as the Euclidian distance between two vectors theta and theta'. If d(theta_current, theta_last) is less than a fixed threshold, we may quit the iterations in exemplary embodiments.

In step 2 of the EM algorithm in exemplary embodiments, the current estimation model is used to estimate a temporary value of a latent variable. This corresponds to step 2. Once an interval output is replaced with a point output, a conventional regression technique can be applied, and therefore step 3 can be readily solved.

The repetition at step 4 does not degrade the quality of the model because the exemplary technique is based on the EM algorithm, and convergence of iterations is ensured. Equation (1) and Equation (2) below may be repeated alternately. For example, at each iteration, the likelihood function in the EM algorithm is guaranteed to increase. Since the likelihood function is bounded, the likelihood function converges in accordance with exemplary embodiments.

Referring to FIG. 1, FIG. 1 illustrates a method for regression from interval target values in accordance with exemplary embodiments. Training data having an interval output is read by the application 220 at 100. The training data may be retrieved by the application 220 from the server 230 and/or the storage 240 via the network 250.

An initial model is estimated by the application 220 at 110. For example, the most naïve method is to give the initial model parameters randomly. Another method may be to use only the data with point outputs for estimating the initial model. For example, in the case of linear Gaussian model, we may apply Equation (4) and Equation (5) below for the data with point outputs to get the initial model.

Representative values for the interval output are assigned by the application 220 using the initial model at 120. An existing regression method may be invoked to assign representative values for the initial model at 125. As a non-limiting example, the application 220 may use Equation (1) to assign the representative values for the i-th data with an interval output.

A regression model is estimated utilizing the representative values for the interval output by the application 220 at 130. As a non-limiting example, generally, the optimization problem stated as Equation (2) is solved. As a particular case, in which a linear Gaussian model is used, the solutions may be given by Equation (4) and Equation (5). The application 220 makes a determination whether the regression model converges at 140. In response to the regression model not converging at step 140, an iteration may be performed for the step 120 for assigning representative values for the interval output, and an iteration may be performed for the step 130 for estimating the regression model using the representative values for the interval output. As a non-limiting example, the application 220 iteratively assigns different representative values for the interval output and then refines the regression model based on the newly assigned representative values. This process continues refining the regression model until the application 220 determines that the regression model converges in step 140.

In response to the regression model converging at step 140, the regression model is outputted by the application 220 at 150.

A non-limiting example is illustrated of a specific algorithm detailing the procedure above in accordance with exemplary embodiments. Assume that the following data and algorithm are given, e.g., from the server 230. Training data may include N pairs of input and output $E=\{(x^{(i)},[l^{(i)},r^{(i)}])\}_{i=1}^{N}$ having interval outputs. The fundamental regression algorithm may be a regression algorithm that estimates a probabilistic model $f(y|x;\theta)$ from training data of point outputs using maximum likelihood estimation, where $\theta$ is a model parameter.

Note that this standard regression algorithm cannot be directly applied to the training data because the training data here has interval outputs (i to N). Also note that the standard regression algorithm outputs a probabilistic model. However, this is not a strict constraint and most regression algorithms output a probabilistic model. The application 220 may implement the following operations in accordance with exemplary embodiments.

Step 1: An appropriate point output is given using the existing Approach 2 described earlier and the standard regression algorithm is applied to obtain a model (to be exact, a model parameter). Alternatively, a random parameter may be assigned to obtain a model. The parameter obtained here is denoted by $\hat{\theta}$. In other words, the model may be specified by its parameters. For example, a linear Gaussian model $f(y|x, \theta, \sigma)=N(y|\theta\phi(x)^T, \sigma I)$ of Equation (2) has parameters theta and sigma. Therefore, the model that is obtained (e.g., by the application 220) is the parameters themselves.

Step 2: For the i-th training data $(x^{(i)}, [l^{(i)}, r^{(i)}])$, a temporary value of the point output is obtained by $$y^{(i)} = \frac{\int_{l^{(i)}}^{r^{(i)}} y f(y|x^{(i)}; \hat{\theta}) dy}{\int_{l^{(i)}}^{r^{(i)}} f(y|x^{(i)}; \hat{\theta}) dy}$$

EQUATION (1)

where $l^{(i)}=r^{(i)}$, then $y^{(i)}:=l^{(i)}=r^{(i)}$.

Equation (1) may be equivalent to obtaining a conditional expectation $E_{y|x}[y|x,[l^{(i)},r^{(i)}],\hat{\theta}]$ (in the current model of $y^{(i)}$ in Equation 1) that is a latent variable in the EM algorithm and replacing $y^{(i)}$ with the conditional expectation.

If a closed form solution cannot be obtained in actual evaluation of Equation (1), evaluation may be performed using sampling or the like. For example, the Metropolis method, which is one of Markov Chain Monte Carlo methods, can be used.

If an interval [l, r] of the output value for a new input x is given (e.g., as described in scenario 1 or 2), prediction may be made by assigning $x^{(i)}:=x$, $l^{(i)}:=l$, and $r^{(i)}:=r$ in Equation (1). Many inputs may be assigned, and Equation (1) may be applied, multiples times, independently for each of the values in exemplary embodiments.

Step 3: For the standard regression algorithm, $y^{(1)}, y^{(2)}, \ldots, y^{(N)}$ obtained at step 2 are used to perform maximum likelihood estimation of the model. Specifically, the estimation parameter $\hat{\theta}$ is updated by $$\hat{\theta} = \underset{\theta}{\operatorname{argmax}} \sum_{i=1}^{N} \log f(y^{(i)}|x^{(i)}, \theta).$$

EQUATION (2)

By alternating Equation (1) and Equation (2), the converged $\hat{\theta}$ can be obtained. Then, a probabilistic model $f(y|x; \hat{\theta})$ can be obtained. We may alternate step 2 (to get $y^{(i)}$s) and step 3 (to get $\hat{\theta}$) until convergence. Once converged, the parameter $\hat{\theta}$ is obtained.

Another non-limiting example is illustrated below in which the application 220 may implement a more specific algorithm utilizing a linear Gaussian model as the fundamental regression model in accordance with exemplary embodiments.

A linear Gaussian model f is as follows: $f(y|x,\theta,\sigma)=N(y|\theta\phi(x)^T, \sigma I)$. Here, $N(\cdot|\mu,\Sigma)$ represents the probability density function of normal distribution in which $\mu$ is the mean and $\Sigma$ is the covariance matrix. That is, a linear Gaussian model is represented as a normal distribution in which the mean is a linear function $\theta\phi(x)^T$ and the covariance is a unit matrix $\sigma I$ multiplied by a constant. The parameters are $\theta=(\theta_1, \theta_2, \ldots, \theta_Z)$ (vector) and $\sigma$ (scalar).

In the Gaussian model equation, $\phi(x)$ is a Z-dimensional base vector (mapped from x that is initially D-dimensional to a Z-dimensional space by using an appropriate function $\phi$), $\phi(x)=(\phi_1(x), \phi_2(x), \ldots, \phi_Z(x))$. For training data, a matrix $\Phi$ in which the base vectors are arranged may be defined as follows:

$$\Phi = \begin{pmatrix} \phi_1(x^{(1)}), & \phi_2(x^{(1)}), & \ldots, & \phi_Z(x^{(1)}) \\ \phi_1(x^{(2)}), & \phi_2(x^{(2)}), & \ldots, & \phi_Z(x^{(2)}) \\ \vdots & \vdots & \vdots & \vdots \\ \phi_1(x^{(N)}), & \phi_2(x^{(N)}), & \ldots, & \phi_Z(x^{(N)}) \end{pmatrix} \quad \text{EQUATION (3)}$$

When $y = (y^{(1)}, y^{(2)}, \ldots, y^{(N)})$ are known, maximum likelihood estimation in the linear Gaussian model in Equation (3) can be obtained as using the following equations.

$$\hat{\theta} = (\lambda I + \Phi^T \Phi)^{-1} \Phi^T y^T \quad \text{EQUATION (4)}$$

$$\hat{\sigma} = \sqrt{\frac{1}{N}(\theta \Phi(x)^T - y)(\theta \Phi(x)^T - y)^T} \quad \text{EQUATION (5)}$$

where $\lambda$ is a regularization parameter (an appropriate constant value greater than or equal to 0 provided by a user) for stabilizing the estimation.

Furthermore, specific steps in the linear Gaussian model are described below.

Step 1: Approach 2 may be used to give appropriate point outputs or Equation (3) for only a set of i in which $l^{(i)} = r^{(i)}$ is used. Equations (4) and (5) may be used to obtain parameter estimate values.

Step 2: For the i-th training data $(x^{(i)}, [l^{(i)}, r^{(i)}])$, a temporary value of a point output may be obtained by using the following equation.

$$y^{(i)} = \frac{\int_{l^{(i)}}^{r^{(i)}} y \exp\left(-\frac{1}{2\hat{\sigma}^2}(y - \hat{\theta}\phi(x^{(i)}))^2\right) dy}{\int_{l^{(i)}}^{r^{(i)}} \exp\left(-\frac{1}{2\hat{\sigma}^2}(y - \hat{\theta}\phi(x^{(i)}))^2\right) dy} \quad \text{EQUATION (6)}$$

The integrals are obtained by sampling (or the like).

Step 3: Using $y^{(1)}, y^{(2)}, \ldots, y^{(N)}$ obtained at step 2, maximum likelihood estimation of the Gaussian model is performed in accordance with Equations (4) and (5). Substituting $\hat{\theta}$ and sigma_hat obtained using Equation (4) and Equation (5) into the linear Gaussian model $f(y|x,\theta,\sigma) = N(y|\theta\phi(x)^T, \sigma I)$ results in the desired parameters in accordance with exemplary embodiments. As discussed herein, we may alternate step 2 (to get $y^{(i)}$ by using Equation (6)) and step 3 (to get $\hat{\theta}$ and sigma_hat by utilizing Equation (4) and Equation (5)) until convergence. When converged, the $\hat{\theta}$ and the sigma at that time are the desired parameters. By substituting the desired parameters into the linear Gaussian model, a model is obtained for the output interval in accordance with exemplary embodiments.

As discussed herein, exemplary embodiments provide an advantageous effect. Further, correspondences between the processes of the exemplary embodiments and the EM algorithm are illustrated below.

A target function to be maximized may be defined as $$E = \sum_{i=1}^{N} \log Pr(y^{(i)} \in [l^{(i)}, r^{(i)}] | x^{(i)}) \quad \text{EQUATION (7)}$$

-continued $$= \sum_{i=1}^{N} \log \int_{l^{(i)}}^{r^{(i)}} f(y^{(i)} | x^{(i)}) dy^{(i)}$$

Maximizing the target function of Equation (7) means maximizing the probability that prediction will be included in a given interval. As a non-limiting example, we may find f (y|x) that maximizes the objective function E. Usually f is a more concrete class of functions (e.g., the linear Gaussian model) and is specified by parameters (theta and sigma in the linear Gaussian model). So, in such cases, we maximize E with respect to the parameters. When an output is given as a point as in a conventional case, (that is, when $l^{(i)} = r^{(i)}$), it is assumed that $r^{(i)} = l^{(i)} + \Delta$ for a minute $\Delta$, conforming to conventional maximum likelihood estimation.

Because it is difficult to directly maximize the target function of Equation (7), the lower bound of Equation (7) is obtained and is maximized one by one in order to maximize Equation (7) in accordance with exemplary embodiments.

If an approximation $g(y^{(i)}|x, [l^{(i)}, r^{(i)}])$ of posterior distribution of $y^{(i)}$ is introduced, we can establish the following expression.

$$E = \sum_{i=1}^{N} \log \int_{l^{(i)}}^{r^{(i)}} f(y^{(i)} | x^{(i)}) dy^{(i)} \quad \text{EQUATION (8)}$$

$$= \sum_{i=1}^{N} \log \int_{l^{(i)}}^{r^{(i)}} f(y^{(i)} | x^{(i)}) \frac{g(y^{(i)} | x, [l^{(i)}, r^{(i)}])}{g(y^{(i)} | x, [l^{(i)}, r^{(i)}])} dy^{(i)} \quad \text{EQUATION (9)}$$

$$\geq \sum_{i=1}^{N} \int_{l^{(i)}}^{r^{(i)}} g(y^{(i)} | x, [l^{(i)}, r^{(i)}]) \quad \text{EQUATION (10)}$$

$$\log \frac{f(y^{(i)} | x^{(i)})}{g(y^{(i)} | x, [l^{(i)}, r^{(i)}])} dy^{(i)}$$

Here, the Jensen's inequality is used.

Extraction of a portion relating of f yields the following from the Jensen's inequality.

$$\sum_{i=1}^{N} \int_{l^{(i)}}^{r^{(i)}} g(y^{(i)} | x, [l^{(i)}, r^{(i)}]) \log f(y^{(i)} | x^{(i)}) dy^{(i)} \quad \text{EQUATION (11)}$$

The step of evaluating Equation (1) (i.e., the E-step), the step of maximizing Equation (11) for f, and the step of using the obtained f to obtain g as Equation (12) (i.e., the M-step) are alternately performed. The E-step and the M-step form the EM algorithm.

$$g(y^{(i)} | x, [l^{(i)}, r^{(i)}]) = \quad \text{EQUATION (12)}$$

$$\begin{cases} \dfrac{f(y^{(i)} | x^{(i)})}{\int_{l^{(i)}}^{r^{(i)}} f(y^{(i)} | x^{(i)}) dy^{(i)}} & \text{for } y^{(i)} \in [l^{(i)}, r^{(i)}], \\ 0 & \text{otherwise} \end{cases}$$

Step 3 in the above method according to exemplary embodiments corresponds to maximization for f, and step 2 corresponds to the remaining part.

In accordance with exemplary embodiments, the performance of the methods discussed herein has been tested by using benchmark data. As a non-limiting example, "Boston housing" data set in UCI Machine Learning Repository was used. In the Boston housing problem, the price of a house is estimated from 13 indices such as the crime rate in the town and the number of rooms of the house. The data set includes 506 samples.

From the Boston housing problem, Table 1 below illustrates a comparison between existing methods and methods of exemplary embodiments in prediction mean square error using two-fold cross validation and the p-values in the comparison between the methods. The p-value is used in the Wilcoxon signed rank test, which is used for testing the difference of two sets of values. In our example Boston housing problem, the p-values are used to test whether or not one method is better than the other in terms of mean squared error. In Table 1, it is better to have a lower p-value. For example, if p=0.05, the mean error is significantly small at the 5% significance level. It can be seen from Table 1 that the method of the exemplary embodiments has smaller prediction errors.

TABLE 1

| Method | Mean square error | Advantage over existing method 1 | Advantage over existing method 2 | Advantage over proposed method L |
|---|---|---|---|---|
| Existing method Approach 1 | 14.18 | — | — | — |
| Existing method Approach 2 | 13.84 | 0.01546 | — | — |
| Exemplary method L | 12.03 | 0.00186 | 0.00711 | — |
| Exemplary method LR | 11.37 | 0.00002 | 0.00011 | 0.00664 |

In the original Boston housing problem, the prices of houses which are outputs to be estimated were given as point outputs. In our experiment, the following modifications were made to create our simulation setting. The order of data was randomly shuffled. The 1st to 253-rd data (one half of the entire data) were used directly as point output data (that is, $l^{(i)}=r^{(i)}$ data). The 254-th to 506-th data were converted to interval output data. In particular, interval outputs $[l^{(i)}, r^{(i)}]$ were generated from point outputs $y^{(i)}$ as shown below. Note that the two data sets, $D_L$ and $D_{LR}$, were generated depending on methods for generating interval outputs: For generating an interval output in data $D_L$ in which $l^{(i)}$ alone is given, uniform random numbers $\epsilon_L^{(i)}$ from 0 to $y^{(i)}/10$ were generated as $l^{(i)}=y^{(i)}-\epsilon_L^{(i)}$, and we set $r^{(i)}=\infty$. For generating an interval output in data $D_{LR}$ in which both $l^{(i)}$ and $r^{(i)}$ are given, uniform random numbers $\epsilon_L^{(i)}$ from 0 to $y^{(i)}/10$ were generated as $l^{(i)}=y^{(i)}-\epsilon_L^{(i)}$. Also, uniform random numbers $\epsilon_R^{(i)}$ from 0 to $y^{(i)}/10$ were generated as $r^{(i)}=y^{(i)}+\epsilon_R^{(i)}$.

In the Boston housing problem, point output data was randomly divided into 90% training data and 10% test data. This process was repeated 30 times to generate 30 data sets. The data sets were used to compare the following three methods based on a linear Gaussian model.

First, the existing naive method was used for the existing method Approach 1 in Table 1. The 1st to 253-rd point output data were used to perform conventional regression.

Second, a little more sophisticated existing method was used in the existing method Approach 2. An EM method (not according to the exemplary embodiments) is applied in which all data were used, and Equation (1) was replaced with Equation (13).

$$y^{(i)}=\int_{-\infty}^{\infty} yf(y|x^{(i)};\hat{\theta})dy \qquad \text{EQUATION (13)}$$

This method is the method in which interval outputs are simply replaced with prediction expected values rather than using interval information.

Third, for exemplary method L, data $D_L$ was used, and the exemplary method L was applied in accordance with exemplary embodiments.

Fourth, for exemplary method LR of the exemplary embodiments, data $D_{LR}$ was used, and the exemplary method LR was applied in accordance with exemplary embodiments.

In the Boston housing test problem, the Gaussian kernel $\phi i(x)=\exp(-\alpha\|x-x^{(i)}\|^2)$ was used as the base in Equation (3). Here, $\alpha$ is the scale parameter for the Gaussian kernel. We set $\alpha=0.03$, which achieved the best results by using the existing naive method.

Table 1 shows mean squared errors obtained by the methods and p-values obtained by the Wilcoxon signed rank-sum test used for determining whether there is a difference in average of the results in each set of the methods. It can be seen that the exemplary method L and exemplary method LR have the smallest prediction error. As can be seen from the Boston housing test problem, exemplary embodiments are able to appropriately incorporate interval data.

Figure 3:
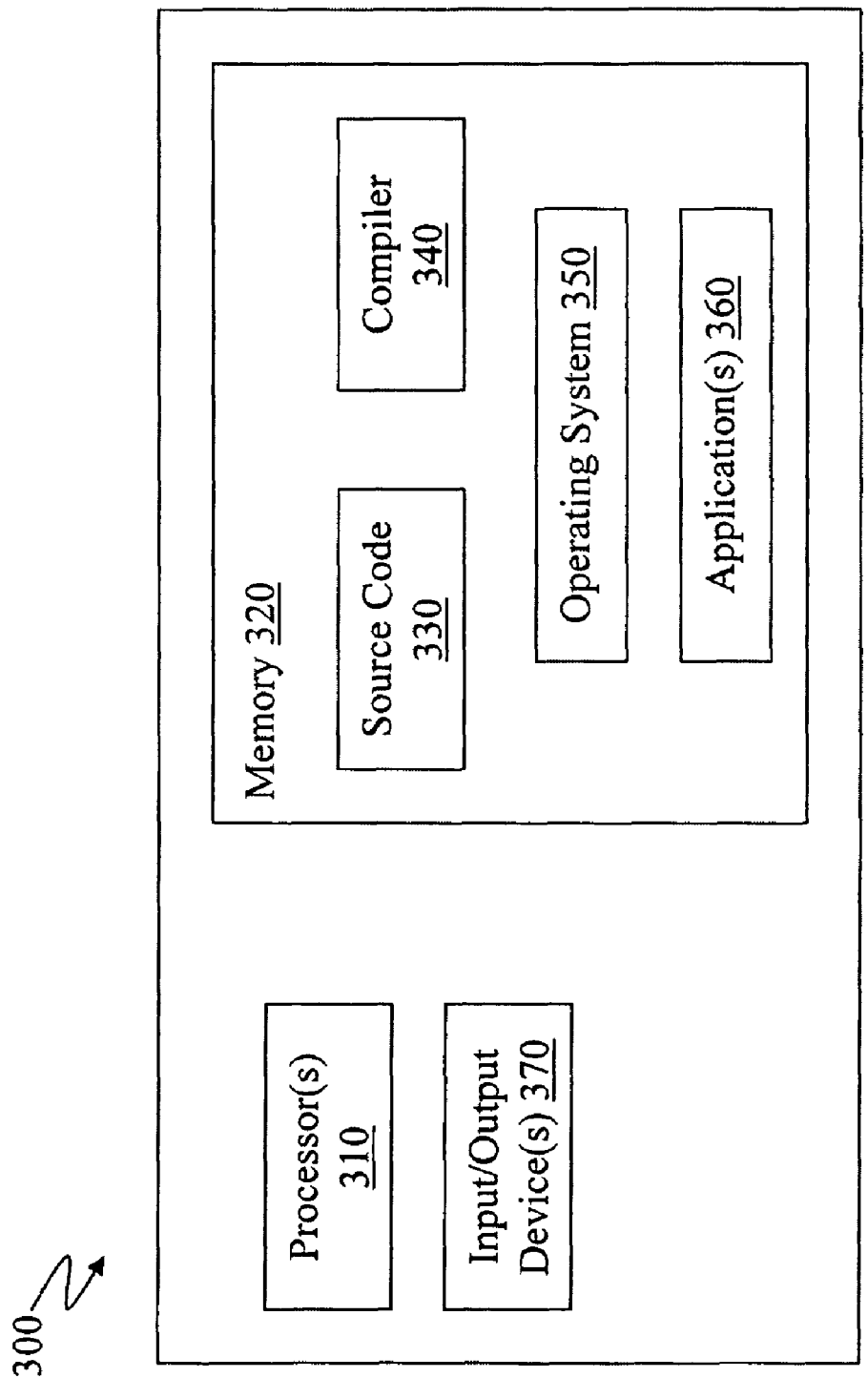
FIG. 3 illustrates a non-limiting example of a computer having capabilities, which may be included in exemplary embodiments.

FIG. 3 illustrates an example of a computer 300 having capabilities, which may be included in exemplary embodiments. Various operations discussed above may also utilize the capabilities of the computer 300. One or more of the capabilities of the computer 300 may be incorporated in any element or component discussed herein, such as the computing device 210 and the server 230.

The computer 300 includes, but is not limited to, PCs, workstations, laptops, PDAs, palm devices, servers, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a data signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and an application 360 (which may be one or more applications) of the exemplary embodiments. As illustrated, the application 360 comprises numerous functional components for implementing the features and operations of the exemplary embodiments. The application 360 of the computer 300 may represent various applications, computational units, logic, functional units, processes, operations, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments is applicable on all commercially available operating systems.

The application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such at the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 300 includes non-limiting examples of software and hardware components that may be included in various devices and systems discussed herein, and it is understood that additional software and hardware components may be included in the various devices and systems discussed in exemplary embodiments.

The capabilities of the present invention can be implemented in software, firmware, hardware or some combination thereof.

As one example, one or more features of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method on a computer for regression from interval target values, comprising:
    reading training data comprising an interval output;
    estimating an initial model;
    assigning representative values for the interval output of the training data using the initial model;
    estimating a regression model using the representative values for the interval output of the training data;
    determining on the computer whether the regression model converges by alternating between evaluating a linear Gaussian model and an expectation-maximization algorithm until the regression model converges;
    iterating the step of assigning representative values for the interval output and iterating the step of estimating the regression model using the representative values for the interval output, in response to the regression model not converging; and
    outputting the regression model, in response to the regression model converging.

2. The method of claim 1, wherein the expectation-maximization algorithm is:

$$y^{(i)} = \frac{\int_{l^{(i)}}^{r^{(i)}} y f(y \mid x^{(i)}; \hat{\theta}) dy}{\int_{l^{(i)}}^{r^{(i)}} f(y \mid x^{(i)}; \hat{\theta}) dy}, \text{ where } \hat{\theta} = \operatorname*{argmax}_{\theta} \sum_{i=1}^{N} \log f(y^{(i)} \mid x^{(i)}, \theta);$$

and
wherein the linear Gaussian model is:

$$y^{(i)} = \frac{\int_{l^{(i)}}^{r^{(i)}} y \exp\left(-\frac{1}{2\hat{\sigma}^2}(y - \hat{\theta}\phi(x^{(i)}))^2\right) dy}{\int_{l^{(i)}}^{r^{(i)}} \exp\left(-\frac{1}{2\hat{\sigma}^2}(y - \hat{\theta}\phi(x^{(i)}))^2\right) dy}$$

where $\hat{\theta} = (\lambda I + \Phi^T \Phi)^{-1} \Phi^T y^T$,
where $$\hat{\sigma} = \sqrt{\frac{1}{N}(\theta\Phi(x)^T - y)(\theta\Phi(x)^T - y)^T},$$

and
where $$\Phi = \begin{pmatrix} \phi_1(x^{(1)}), & \phi_2(x^{(1)}), & \ldots, & \phi_Z(x^{(1)}) \\ \phi_1(x^{(2)}), & \phi_2(x^{(2)}), & \ldots, & \phi_Z(x^{(2)}) \\ \vdots & \vdots & \vdots & \vdots \\ \phi_1(x^{(N)}), & \phi_2(x^{(N)}), & \ldots, & \phi_Z(x^{(N)}) \end{pmatrix}.$$

3. The method of claim 1, wherein the linear Gaussian model is utilized to estimate the initial model; and
    wherein the representative values are assigned by determining a mean of the interval output.

4. The method of claim 1, wherein the expectation-maximization algorithm is utilized to estimate the initial model.

5. The method of claim 1, wherein the representative values are temporary values assigned to represent the interval output of the training data.

6. The method of claim 5, wherein the temporary values of the interval output are combined with point values of the training data to estimate the regression model.

7. The method of claim 1, wherein the interval output comprises a plurality of numbers beginning with a first value and ending with a last value.

8. A computing device for regression from interval target values, comprising:
    memory for storing an application;
    a processor, functionally coupled to the memory, the processor being responsive to computer-executable instructions contained in the application and operative to:
    read training data comprising an interval output;
    estimate an initial model;
    assign representative values for the interval output of the training data using the initial model;
    estimate a regression model using the representative values for the interval output of the training data;
    determine whether the regression model converges by alternating between evaluating a linear Gaussian model and an expectation-maximization algorithm until the regression model converges;
    iterate the step of assigning representative values for the interval output and iterate the step of estimating the regression model using the representative values for the interval output, in response to the regression model not converging; and
    output the regression model, in response to the regression model converging.

9. The computing device of claim 8, wherein the representative values are assigned by determining a mean of the interval output.

10. The computing device of claim 8, wherein the linear Gaussian model is utilized to estimate the initial model.

11. The computing device of claim 8, wherein the expectation-maximization algorithm is utilized to estimate the initial model.

12. The computing device of claim 8, wherein the representative values are temporary values assigned to represent the interval output.

13. The computing device of claim 12, wherein the temporary values of the interval output are combined with point values of the training data to estimate the regression model.

14. The computing device of claim 13, wherein other temporary values are repeatedly inserted as the representative values for the interval output; and
    wherein the regression model is estimated.

15. A computer program product, tangibly embodied on a computer readable medium, for regression from interval target values, the computer program product including instructions for causing a computer to execute a method, comprising:

reading training data comprising an interval output;
estimating an initial model;
assigning representative values for the interval output of the training data using the initial model;
estimating a regression model using the representative values for the interval output of the training data;
determining whether the regression model converges by alternating between evaluating a linear Gaussian model and an expectation-maximization algorithm until the regression model converges;
iterating the step of assigning representative values for the interval output and iterating the step of estimating the regression model using the representative values for the interval output, in response to the regression model not converging; and
outputting the regression model, in response to the regression model converging.

16. The computer program product of claim 15, wherein the expectation-maximization algorithm is utilized to estimate the initial model.

17. The computer program product of claim 15, wherein the representative values are temporary values assigned to represent the interval output.

18. The computer program product of claim 17, wherein the temporary values of the interval output are combined with point values of the training data to estimate the regression model.

19. The computer program product of claim 18, wherein other temporary values are repeatedly inserted as the representative values for the interval output; and
wherein the regression model is estimated.

* * * * *